(12) United States Patent
Zhang

(10) Patent No.: US 10,667,082 B2
(45) Date of Patent: May 26, 2020

(54) METHOD AND APPARATUS FOR DETERMINING INDEX GRIDS OF GEO-FENCE

(71) Applicant: Alibaba Group Holding Limited, George Town, Grand Cayman (KY)

(72) Inventor: Hui Zhang, Zhejiang (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/592,853

(22) Filed: Oct. 4, 2019

(65) Prior Publication Data

US 2020/0037102 A1    Jan. 30, 2020

Related U.S. Application Data

(63) Continuation of application No. PCT/CN2018/089148, filed on May 31, 2018.

(30) Foreign Application Priority Data

Jun. 2, 2017   (CN) .......................... 2017 1 0407332

(51) Int. Cl.
*H04W 24/00* (2009.01)
*H04W 4/021* (2018.01)
(Continued)

(52) U.S. Cl.
CPC ........ *H04W 4/022* (2013.01); *G06F 16/2246* (2019.01); *G06F 16/2272* (2019.01); *G06F 16/29* (2019.01)

(58) Field of Classification Search
CPC ...... H04W 4/021; H04W 4/023; H04W 4/022
(Continued)

(56) References Cited

U.S. PATENT DOCUMENTS 10,382,890 B1 *   8/2019   Stirling .............. H04L 67/2842
2004/0010721 A1 * 1/2004   Kirovski ................. G06F 21/36
                                                                     713/183
(Continued)

FOREIGN PATENT DOCUMENTS

CN      103092853 A      5/2013
CN      106303950 A      1/2017

OTHER PUBLICATIONS

Written Opinion of the International Searching Authority of PCT Application No. PCT/CN2018/089148, dated Sep. 12, 2018.
(Continued)

*Primary Examiner* — Joseph Arevalo
(74) *Attorney, Agent, or Firm* — Finnegan, Henderson, Farabow, Garrett & Dunner, L.L.P.

(57) ABSTRACT

A method for determining index grids of a geo-fence, includes: determining a circumscribed grid of the geo-fence, the circumscribed grid being a smallest single grid in a pre-defined granularity system that can contain the geo-fence; with the circumscribed grid as a starting point, subdividing one or more grids containing a boundary of the geo-fence into finer-grained grids level by level until an index accuracy of a subdivided grid set is not lower than a predetermined precision threshold, wherein the grid set is composed of grids within the geo-fence and grids containing the boundary of the geo-fence, and the index accuracy is a ratio of an area of the geo-fence to a sum of areas of all the grids in the grid set; and taking the grids in the grid set as index grids of the geo-fence.

12 Claims, 10 Drawing Sheets

(51) Int. Cl.
*G06F 16/22* (2019.01)
*G06F 16/29* (2019.01)

(58) Field of Classification Search
USPC ........ 455/456.1, 411, 456.2, 423, 457, 422.1
See application file for complete search history.

(56) References Cited

U.S. PATENT DOCUMENTS

| | | | |
|---|---|---|---|
| 2012/0053991 A1* | 3/2012 | Shimizu | G06Q 30/02 705/7.34 |
| 2012/0309413 A1* | 12/2012 | Grosman | H04W 64/006 455/456.1 |
| 2017/0139934 A1* | 5/2017 | Laventman | G06F 16/9537 |
| 2018/0075108 A1* | 3/2018 | Park | G06F 16/29 |
| 2018/0183507 A1* | 6/2018 | Franz | H04B 7/0626 |
| 2018/0189665 A1* | 7/2018 | Zhang | G06F 16/9537 |

OTHER PUBLICATIONS

International Search Report of PCT Application No. PCT/CN2018/089148, dated Sep. 12, 2018.
Zhang, H., & Yang, M., "*Circulation of the Irregular Area Based on Fourth—Division Method*", Geomatics & Spatial Information Technology, vol. 34, No. 6, Dec. 2011, pp. 272-274.

* cited by examiner

100

┌─────────────────────────────────────────────────────────────────┐
│ Determining a Circumscribed Grid of the Geo-Fence, the Circumscribed Grid │ ─── 110
│ Being Smallest Single Grid Containing Geo-Fence                 │
└─────────────────────────────────────────────────────────────────┘
                                    ↓
┌─────────────────────────────────────────────────────────────────┐
│ With the Circumscribed Grid as a Starting Point, Subdividing Grid(s) │
│ Containing the Boundary of the Geo-Fence Into Finer-Grained Grids Level by │ ─── 120
│ Level Until Index Accuracy of a Subdivided Grid Set Is Not Lower Than a │
│ Predetermined Precision Threshold, the Grid Set Being Composed of Grids │
│ Within the Geo-Fence and Grids Containing the Boundary of the │
│ Geo-Fence │
└─────────────────────────────────────────────────────────────────┘
                                    ↓
┌─────────────────────────────────────────────────────────────────┐
│ Taking the Grids in the Grid Set as Index Grids of the Geo-Fence │ ─── 130
└─────────────────────────────────────────────────────────────────┘

FIG. 1

METHOD AND APPARATUS FOR DETERMINING INDEX GRIDS OF GEO-FENCE

CROSS-REFERENCE TO RELATED APPLICATIONS

This application is a continuation application of International Application No. PCT/CN2018/089148, filed on May 31, 2018, which is based upon and claims priority to Chinese Patent Application No. 201710407332.5, filed on Jun. 2, 2017, the entire content of all of which is incorporated herein by reference.

TECHNICAL FIELD

The present application relates to the technical field of computer technologies, and in particular to a method and apparatus for determining index grids of a geo-fence.

TECHNICAL BACKGROUND

With the popularity of mobile Internet services and applications such as Online Map, O2O (Online To Offline), more and more user location data is collected and stored. Geo-fence-based services, such as marketing push and security alert, are the most direct, most real-time and most effective explorations and use of user location data, and have broad application prospects.

A geo-fence is a geographical area enclosed by a virtual fence, and a device may receive push notifications or warnings when the device enters or leaves the area or moves in the area. Grid indexing technology is the foundation of geo-fence-based services. Gridding is a way of dividing two-dimensional geo-space, and each grid covers a certain geographical area. The geo-fence may be approximated as a grid set. A range covered by grids in the grid set is used to simulate the area contained in the geo-fence, which is used for fast retrieval and positioning of the geo-fence. The grids in the grid set are the index grids of the geo-fence.

In the prior art, a geo-fence is usually represented by a plurality of grids of the same granularity, and these index grids should completely cover the area contained in the geo-fence. In the case of the index grids of a coarser granularity, it is difficult to accurately represent the geo-fence, which may cause geo-fence based services to additionally disturb users who are not in the geo-fence. To avoid this problem, the precision of the index grids is usually required to exceed a certain threshold, which often means finer-grained index grids and a sharp increase in the number of indexes. Indexes in a large data volume usually need to be stored in a distributed manner on multiple devices. The larger the data volume, the more complicated the management and maintenance of the indexes, and the slower the query speed, the lower the stability and response speed of a geo-fence-based service.

SUMMARY

In one aspect, a method for determining index grids of a geo-fence, includes: determining a circumscribed grid of the geo-fence, wherein the circumscribed grid is a smallest single grid in a pre-defined granularity system that can contain the geo-fence; with the circumscribed grid as a starting point, subdividing one or more grids containing a boundary of the geo-fence into finer-grained grids level by level until an index accuracy of a subdivided grid set is not lower than a predetermined precision threshold, wherein the grid set is composed of grids within the geo-fence and grids containing the boundary of the geo-fence, and the index accuracy is a ratio of an area of the geo-fence to a sum of areas of all the grids in the grid set; and taking the grids in the grid set as index grids of the geo-fence.

In another aspect, a device for determining index grids of a geo-fence, includes: a processor; and a memory for storing instructions executable by the processor; wherein the processor is configured to: determine a circumscribed grid of the geo-fence, wherein the circumscribed grid is a smallest single grid in a pre-defined granularity system that can contain the geo-fence; with the circumscribed grid as a starting point, subdivide one or more grids containing a boundary of the geo-fence into finer-grained grids level by level until an index accuracy of a subdivided grid set is not lower than a predetermined precision threshold, wherein the grid set is composed of grids within the geo-fence and grids containing the boundary of the geo-fence, and the index accuracy is a ratio of an area of the geo-fence to a sum of areas of all the grids in the grid set; and take the grids in the grid set as index grids of the geo-fence.

In still another aspect, a non-transitory computer-readable storage medium stores a computer program, and when the computer program is executed by a processor of a device, the computer program causes the device to perform the above-mentioned method for determining index grids of a geo-fence.

It can be seen from the above technical solutions that, in embodiments of the specification, with the circumscribed grid of the geo-fence as a starting point, the grids containing the boundary of the geo-fence are subdivided into finer-grained grids level by level until a predetermined precision threshold is met; since the grids within the geo-fence are not subdivided, the grids within the geo-fence may adopt a coarser granularity. Under the premise of fully containing the geo-fence and meeting the precision requirement, the number of index grids is greatly decreased, index storage is less complex, index query speed is increased, and the stability and response speed of a geo-fence based service are improved.

BRIEF DESCRIPTION OF THE DRAWINGS

FIG. 1 is a flowchart of a method for determining index grids of a geo-fence according to an embodiment.

DETAILED DESCRIPTION

Figure 2:
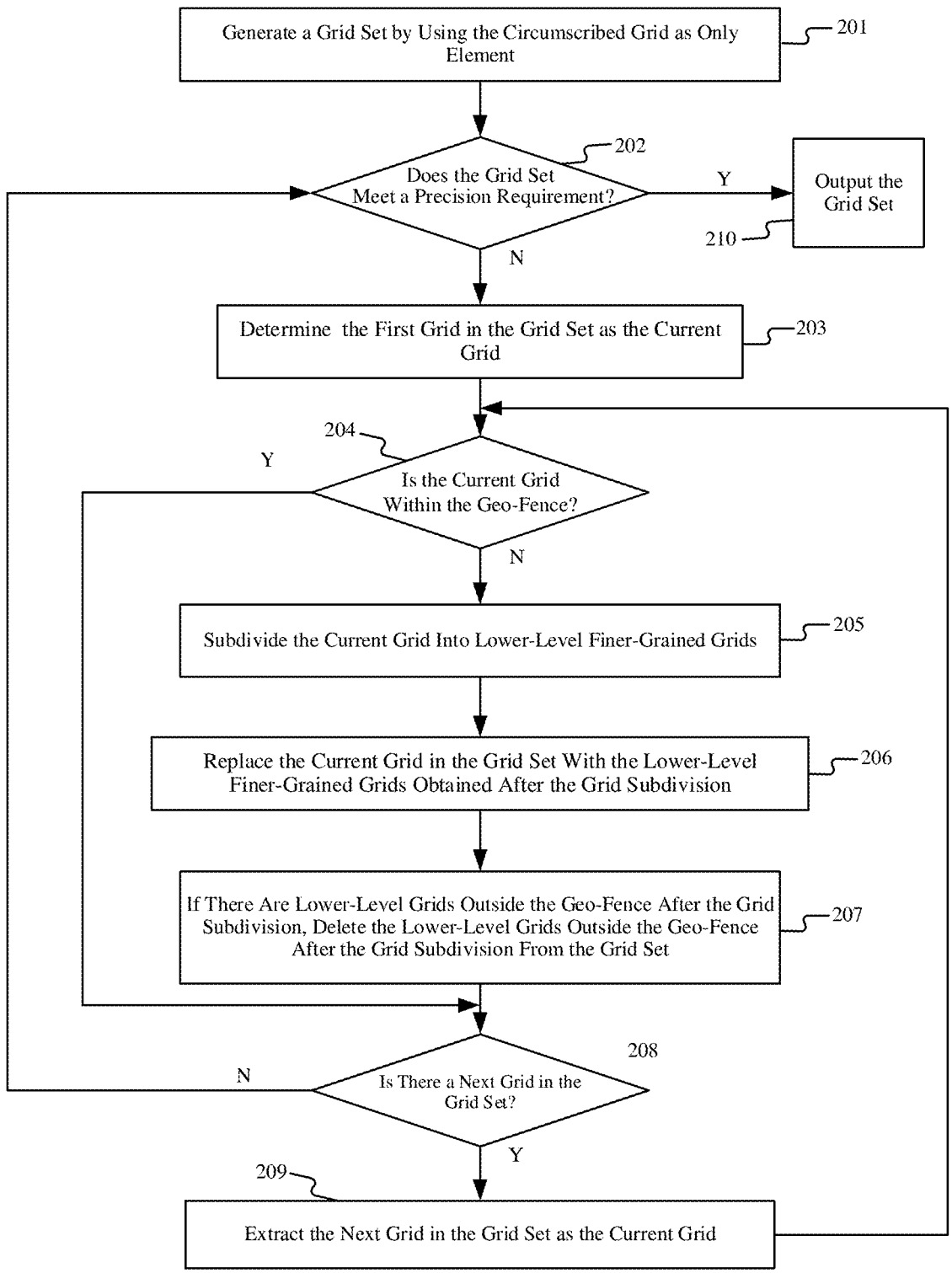
FIG. 2 is a flowchart of a grid subdivision iteration process according to an embodiment.

The grid indexes of a geo-fence may be measured based on three indicators: index coverage, index accuracy, and number of index grids. Assuming that a number of elements in a grid set used to represent a geo-fence is N (N is a natural number), that is, the number of index grids of the geo-fence is N, then the index coverage C of the grid set may be expressed as Equation 1, and the index accuracy P may be expressed as Equation 2:

$$C = \frac{SO}{SF} \quad \text{Equation 1}$$

$$P = \frac{SO}{SI} \quad \text{Equation 2}$$

In Equations 1 and 2, SO is a sum of areas of the portions of all index grids that overlap with the geo-fence, i.e., $SO = \sum_{i=1}^{N} aoo_i$, where $aoo_i$ is the area of the portion of the i-th index grid that overlaps with the geo-fence, and $i \in [1,N]$; SF is the area of the geo-fence; SI is a sum of areas of all the index grids, i.e., $SI = \sum_{i=1}^{N} aog_i$, where $aog_i$ is the area of the i-th index grid, and $i \in [1,N]$.

The technical problem to be solved in the embodiments of the specification may be expressed as follows: under the condition that the grid set completely covers the geo-fence (i.e., C=1), and the index accuracy rate is not lower than a predetermined precision threshold $THR^P$ (i.e., $P \geq THR^P$), the value of N is reduced.

When a geo-fence is represented as a grid set of index grids, the index grids in the grid set may be divided into two categories, one category including grids within the geo-fence, that is, grids with coverage completely falling within the geo-fence, the other category including grids containing the boundary of the geo-fence, that is, grids with coverage both falling within the geo-fence and going beyond the geo-fence. For grids within the geo-fence, regardless of the granularities of those grids, the index accuracy of the grid set is not affected. The index accuracy of a grid set is determined by the granularity of each grid that contains the boundary of the geo-fence. The index accuracy can be improved by increasing the granularity of the grids containing the boundary of the geo-fence (increasing the granularity means using denser grids or finer grids), and reduce the number N of the index grids by allowing the grids within the geo-fence to use a coarser granularity.

Therefore, embodiments of the specification provide a new method for determining, e.g., generating, index grids of a geo-fence. According to the method, a smallest single grid in a pre-defined granularity system that can contain the geo-fence, is considered as a circumscribed grid of the geo-fence, and starting from the circumscribed grid, iteration is performed to subdivide grid(s) containing the boundary of the geo-fence into finer-grained grids level by level and the iteration stops when the index accuracy of the grid set meets a predetermined precision threshold; by only increasing the granularity of the grids containing the boundary of the geo-fence but not further subdividing the grids within the geo-fence, and determining, e.g., generating, grids of different granularities as index grids, the number of index grids is reduced, thereby solving the problems in the prior art.

Embodiments of the specification may run on any computing and storage device, such as a mobile phone, a tablet computer, a PC (Personal Computer), a notebook computer, and a server; and functions in the embodiments may also be implemented by logical nodes running on two or more devices.

FIG. 1 is a flow chart of a method 100 for determining index grids of a geo-fence, according to an embodiment.

In step 110, a circumscribed grid of the geo-fence is determined.

For example, a grid system is a spatial data structure based on the regular hierarchical subdivision of plane subsets. Based on a granularity system, a geographic region may be subdivided, level by level, into multiple mutually adjacent polygon grids from coarse to fine, so as to facilitate the expression of position information and the management of position-related data, and make the organization, analysis and application of data highly efficient.

The grid system usually uses a pre-defined granularity system to divide geographic regions. The granularity system consists of a series of granularities arranged level by level from coarse to fine, and the granularities used in grid subdivision determine the sizes of the grids. For a geographical region divided with a pre-defined granularity system, a grid of T-level granularity (T is a natural number) consists of a number of grids of (T+1)-level granularity and the grids of (T+1)-level granularity are equal in area.

For a geo-fence, the smallest single grid in a pre-defined granularity system that can contain the geo-fence, is a circumscribed grid of the geo-fence. For example, if in the granularity system adopted, a grid of a certain granularity may cover the entire area of the geo-fence, and after the grid is subdivided into grids of a lower-level granularity, each finer-grained grid may only cover a part of the geo-fence, not the entire area of the geo-fence, and then the grid is the circumscribed grid of the geo-fence.

In step 120, with the circumscribed grid as a starting point, grid(s) containing the boundary of the geo-fence are subdivided into finer-grained grids level by level until the index accuracy of a subdivided grid set is not lower than a predetermined precision threshold, wherein the grid set is composed of grids within the geo-fence and the grids containing the boundary of the geo-fence, and the index accuracy is a ratio of the area of the geo-fence to a sum of areas of all the grids in the grid set.

After the circumscribed grid is determined, iteration is started with the circumscribed grid as an index grid of the geo-fence, and in this case, only one element, i.e., the circumscribed grid, is included in the grid set. The index accuracy of the grid set relative to the geo-fence is calculated. If the calculated index accuracy is lower than a predetermined precision threshold, grids containing the boundary of the geo-fence in the grid set are subdivided into finer-grained grids, and grids within the geo-fence in the grid set are not processed; if a finer-grained grid obtained after the grid subdivision is completely outside the geo-fence, the grid outside the geo-fence is deleted from the grid set. The above process is repeated until the index accuracy of the grid set relative to the geo-fence is not lower than the predetermined precision threshold.

Since the circumscribed grid covers the entire area of the geo-fence, and during the iteration, only the grids that are completely outside the geo-fence are deleted from the grid set, all grids in the grid set may always cover the entire area of the geo-fence, and the index coverage of the grid set is 1.

FIG. 2 is a flow chart of an iteration process of the step 120 (FIG. 1), according to an embodiment. Referring to FIG. 2, the step 120 may further include the following steps.

In step 201, a grid set is generated, and elements in the grid set are grids within the geo-fence and grids containing the boundary of the geo-fence. Initially, only one element, i.e., the circumscribed grid, is included in the grid set.

In step 202, with all grid(s) in the grid set as index grid(s) of the geo-fence, the index accuracy of the grid set is calculated according to the above Equation 2. The calculated index accuracy is compared with the predetermined precision threshold; if the calculated index accuracy is not lower than the predetermined precision threshold, the grid set meets the predetermined precision requirement, and then the process proceeds to step 210; otherwise, step 203 is performed.

In step 203, a first grid in the grid set is determined as the current grid.

In step 204, a determination whether the current grid is completely within the geo-fence is made; if the determination result is yes, the process proceeds to step 208; if the determination result is no, the current grid is a grid containing the boundary of the geo-fence, and step 205 is performed.

In step 205, the current grid is subdivided into lower-level finer-grained grids. The specific number of lower-level finer-grained grids the current grid is subdivided into is determined by the granularity system used in a specific application scenario.

In step 206, in the grid set, the current grid is replaced with the lower-level finer-grained grids obtained after the grid subdivision. That is, the current grid is deleted from the grid set, and a number of lower-level finer-grained grids obtained by subdividing the current grid are added to the grid set. In the lower-level finer-grained grids obtained after the grid subdivision, there may be grids containing the boundary of the geo-fence, may be grids within the geo-fence and may be grids outside the geo-fence.

In step 207, if, in a number of lower-level finer-grained grids obtained after grid subdivision, there are grids outside the geo-fence, and since the grids outside the geo-fence will not be index grids of the geo-fence and should not be used as an element of the grid set, the lower-level grids outside the geo-fence after the grid subdivision are deleted from the grid set. If there are no grids outside the geo-fence in the number of lower-level finer-grained grids obtained after grid subdivision, then the deletion operation is not necessary.

In step 208, a determination whether there is a next grid in the grid set is made. If the determination result is yes, step 209 is performed to continue the current iteration. If there is no next grid in the grid set, the current iteration is completed. All grids containing the boundary of the geo-fence in the grid set are already finer-grained grids, and the process proceeds to step 202 to calculate the index accuracy of the grid set to determine whether the next iteration is necessary.

In step 209, the next grid in the grid set is determined as the current grid, and the process proceeds to step 204.

In step 210, the grid set is output, and the iteration process is completed.

It should be noted that the process in FIG. 2 is only an exemplary iteration process, and the iteration process may be implemented in other processes according to the specific situation of an actual application scenario, which will not be limited here.

Returning back to FIG. 1, in step 130, the grids in the grid set are determined as index grids of the geo-fence.

After step 120, all the grids containing the boundary of the geo-fence in the grid set have the same granularity which is the finest (most dense) granularity (hereinafter referred to as "lower-limit granularity") of all grid granularities in the grid set. The grids within the geo-fence in the grid set may have different granularities, and the possible range of their granularities is from the lower-level granularity of the granularity of the circumscribed grid to the lower-limit granularity.

Since the index accuracy of the grid set depends on the granularity of the grids containing the boundary of the geo-fence in the set, it is allowed that the grids within the geo-fence have a larger granularity, so as to reduce the number of index grids while meeting the precision requirement. In particular, in the iteration process in the step 120, according to the actual shape of the geo-fence, coarser-grained grids are used as much as possible to cover the area within the geo-fence, which results in reducing a number of the index grids.

In some embodiments, the processing method for determining the grids in the grid set as the index grids of the geo-fence may include registering an entity corresponding to the geo-fence under an index item of each grid in the grid set. There may be other methods adopted according to the needs of actual application scenarios, which will not be limited herein.

In some embodiments, for the grid set obtained by the step 120, its index accuracy may exceed a predetermined precision threshold. When the index accuracy of the grid set obtained by the step 120 is higher than the predetermined precision threshold, part of grids in the grid set may be merged into coarser-grained grids containing the boundary of the geo-fence, wherein the merging is performed under the condition that the index accuracy after merging is not lower than the predetermined precision threshold; and then in the step 130, the grids in the grid set after merging may be determined as the index grids of the geo-fence. This may further reduce the number of index grids of the geo-fence.

It should be noted that the grid merging refers to replacing a number of finer-grained grids belonging to the same coarser-grained grid with the coarser-grained grid instead of taking a union set of the finer-grained grids. The finer-grained grids belonging to the same coarser-grained grid may not all be elements in the grid set. In this case, one or more fine-grained grids in the grid set may also be merged into the coarser-grained grid.

For example, two or more grids subdivided from the same grid and having the lower-limit granularity may be found in the grid set, the found grids are merged into a coarser-grained grid, and then the index accuracy of the merged grid set is calculated. If the calculated index accuracy is lower than the predetermined precision threshold, the merging stops, and the grid set in this case is the merged grid set. If the calculated index accuracy is not lower than the predetermined precision threshold, all the grids before merging are replaced with the merged coarser-grained grid in the grid set, and then the above process is repeated to find the next set of two or more grids subdivided from the same grid, and whether to merge is determined until the merging stops. The merging mode in this example may be able to further reduce the number of index grids, but may not have the effect of minimizing the number of grid indexes.

In one implementation, a knapsack problem may be used to solve the merging mode that minimizes the number of grid indexes. The knapsack problem may be described as: given a group of items, each item has its own weight and price, and within a defined total weight, how to choose to maximize the total price of the items. In some embodiments, a knapsack problem may be generated in the case where a merged grid containing the boundary of the geo-fence is considered as an item, the increase in the area outside the geo-fence when the item is considered as the index grid in comparison with the area outside the geo-fence before merging is used as the weight of the item, the reduction in the number of grids when the item is used as the index grid in comparison with the number of grids before merging is considered as the price of the item, and the area outside the geo-fence corresponding to the exceedance of the index accuracy of the grid set relative to the predetermined precision threshold is considered as a limited total weight; and the optimal solution to this knapsack problem is considered as a result of grid merging. The result of the grid merging is updated into the grid set to obtain the merged grid set. For example, grids in the result of the grid merging may be added to the grid set, and all the original grids covering the same geographic area with the grids in the result of the grid merging are deleted.

After the knapsack problem is generated, its optimal solution may be obtained using various solutions to the knapsack problem in the prior art, and the embodiments of the specification do not limit it.

An exemplary implementation of solving the knapsack problem is given below. Given that Item a is a merged grid; a grid merged by Item 1 and other items may also be considered as an item, denoted as Item 2; then, Item 2 is a parent item of Item 1, and Item 1 is a child item of Item 2. Since Item 1 and Item 2 contain the same geographic area, and when Item 1 functions as an element of a grid set, Item 2 is not an element of the grid set, and vice versa. That is to say, items having a parent-child relationship cannot exist in one knapsack at the same time, and items having a parent-child relationship include items having direct and indirect parent-child relationships. For example, if Item 3 is the parent item of Item 2, item 1 and item 3 cannot exit in one knapsack at the same time.

When solving the knapsack problem in the present implementation, a tree hierarchy of items may be constructed according to the parent-child relationship between the items, and under a constraint condition that items with the parent-child relationship cannot exist in one knapsack at the same time, all knapsack states of the knapsack problem are then enumerated; each knapsack state is to be solved, and the optimal one in all the answers is the optimal solution to the knapsack problem.

For example, with the lower-limit granularity (i.e., the granularity of the densest grids in the grid set before merging) as a starting point of the current granularity, grids of the current granularity in the grid set may be merged into coarser-grained grids level by level; and with each merged grid as an item, the weight and price of each item are determined until all grids are merged into the circumscribed grid. A tree hierarchy of items may be generated according to the parent-child relationship between the items; leaf nodes (i.e., nodes without subsequent nodes) of the tree hierarchy are grids formed by the grids of the lower-limit granularity, and a root node (i.e., node without a precursor node) is the circumscribed grid.

After the tree hierarchy of the items is constructed, the knapsack state of each item that functions as a leaf node in the tree hierarchy is determined. With child items functioning as leaf nodes as starting points, an intersection of the Cartesian product of knapsack states of all the child items of the parent item and the parent item itself as the knapsack state of the parent item, iteration is performed until the knapsack state of the root node in the tree hierarchy corresponding to the circumscribed grid is finally obtained. In other words, starting from child items functioning as leaf nodes, the knapsack state of their parent item is calculated upward level by level in the tree hierarchy according to Equation 3 until the knapsack state of the root node is calculated.

$$State^F = Node^F + \Pi_{i=1}^{k} State_i^C \qquad \text{Equation 3}$$

In Equation 3, $State^F$ is the knapsack state of the parent item, $Node^F$ is the parent item, $State_i^C$ is the knapsack state of the i-th child item, and k is the number of child items of the parent item.

After the parent item functioning as the root node (i.e., the knapsack state of the circumscribed grid) is obtained through iteration, all the knapsack states of the circumscribed grid are all the knapsack states of the knapsack problem. Each knapsack state may be regarded as a basic knapsack problem. According to the solution to the basic knapsack problem in the prior art, each knapsack state may be solved, and the optimal one of all the solutions to the knapsack states is the optimal solution to the knapsack problem. By taking the optimal solution to the knapsack problem in the present implementation as the merging result of grids in the grid set, the minimum number of index grids of the geo-fence may be obtained while the predetermined precision threshold is met.

It can be seen that, in some embodiments, a smallest single grid in a pre-defined granularity system that can contain the geo-fence, is considered as the circumscribed grid of the geo-fence, and with the circumscribed grid of the geo-fence as a starting point, grid(s) containing the boundary of the geo-fence are subdivided into finer-grained grids level by level until a predetermined precision threshold is met; by only increasing the granularity of the grids containing the boundary of the geo-fence but not further subdividing the grids within the geo-fence and determining grids of different granularities as index grids, the number of index grids is greatly decreased, index storage is less complex, and index query speed is increased.

Further, for the grid set of which the index accuracy exceeds the predetermined precision threshold, a knapsack problem model may be used to merging part of grids in the grid set into a coarser-grained grid, the optimal solution is obtained by constructing a tree hierarchy of the knapsack problem, thereby minimizing the number of indexes while meeting the index accuracy requirement.

Figure 3:
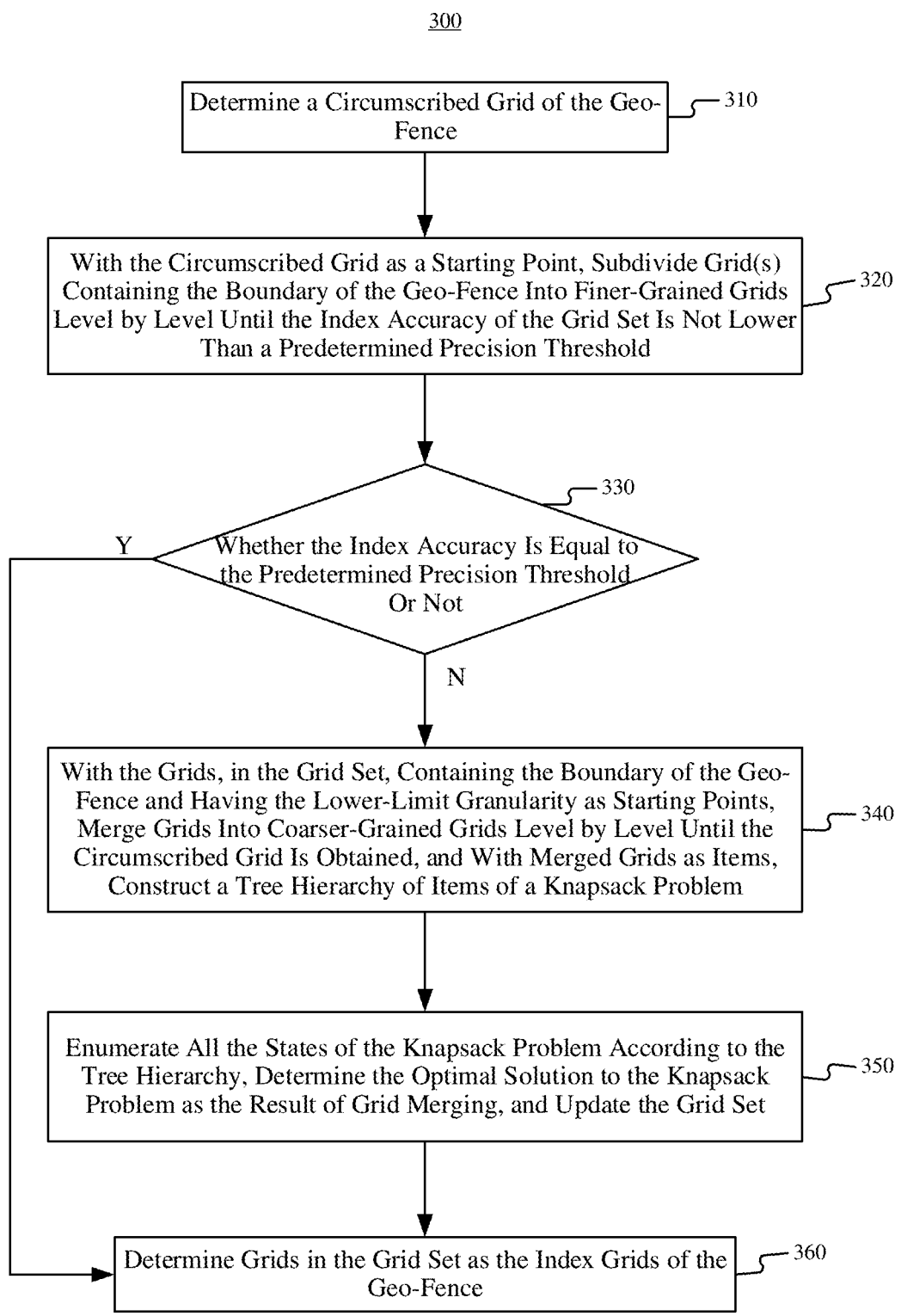
FIG. 3 is a flowchart of a method for determining index grids of a geo-fence according to an embodiment.

FIG. 3 is a flow chart of a method 300 for obtaining index grids of a geo-fence, according to an embodiment. In the embodiment, it is required that the obtained index grids 100% cover the area of the geo-fence, and the index accuracy is not lower than a predetermined precision threshold. An example of the geo-fence is called Geof-Demo.

Figure 4:
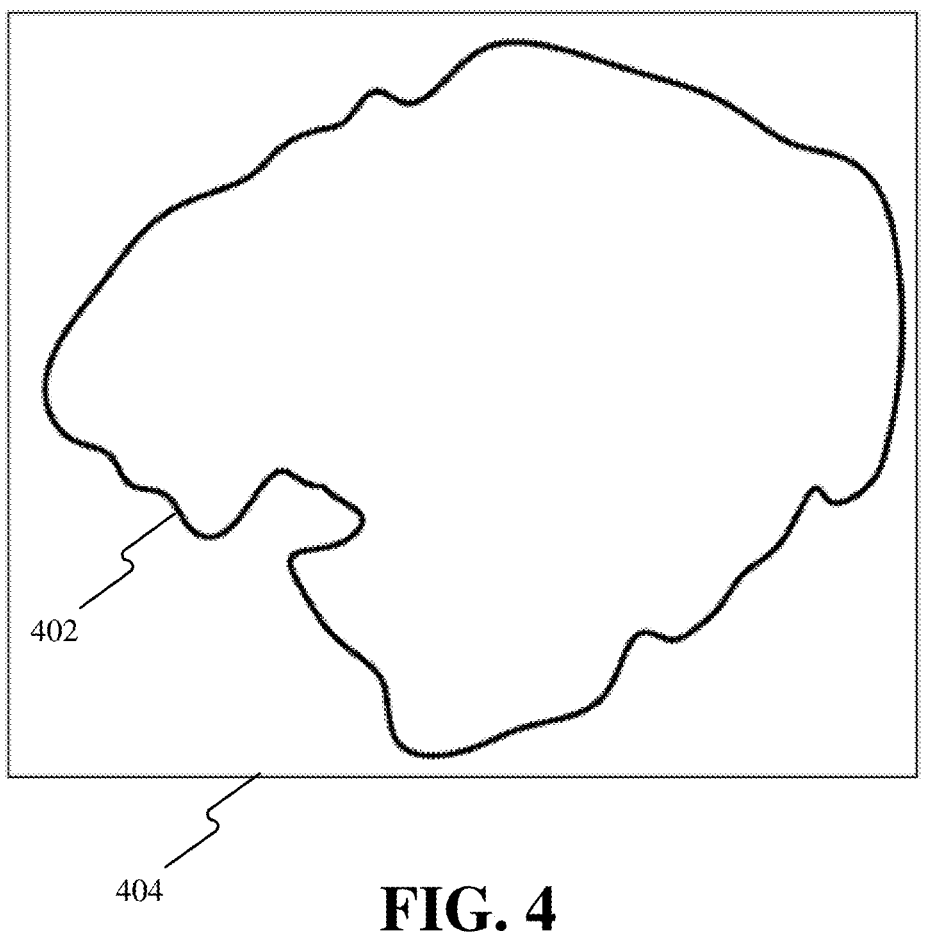
FIG. 4 is a schematic diagram of a boundary of a Geof-Demo and a circumscribed grid of the boundary according to an embodiment.

In step 310, a circumscribed grid of the geo-fence is determined. For example, FIG. 4 shows the Geof-Demo geo-fence 402 and the determined circumscribed grid 404.

In step 320, a grid set is formed by using the circumscribed grid as an element, and grid(s) containing the boundary of the geo-fence are subdivided into finer-grained grids level by level until the index accuracy of a subdivided grid set is not lower than a predetermined precision threshold.

Figure 5:
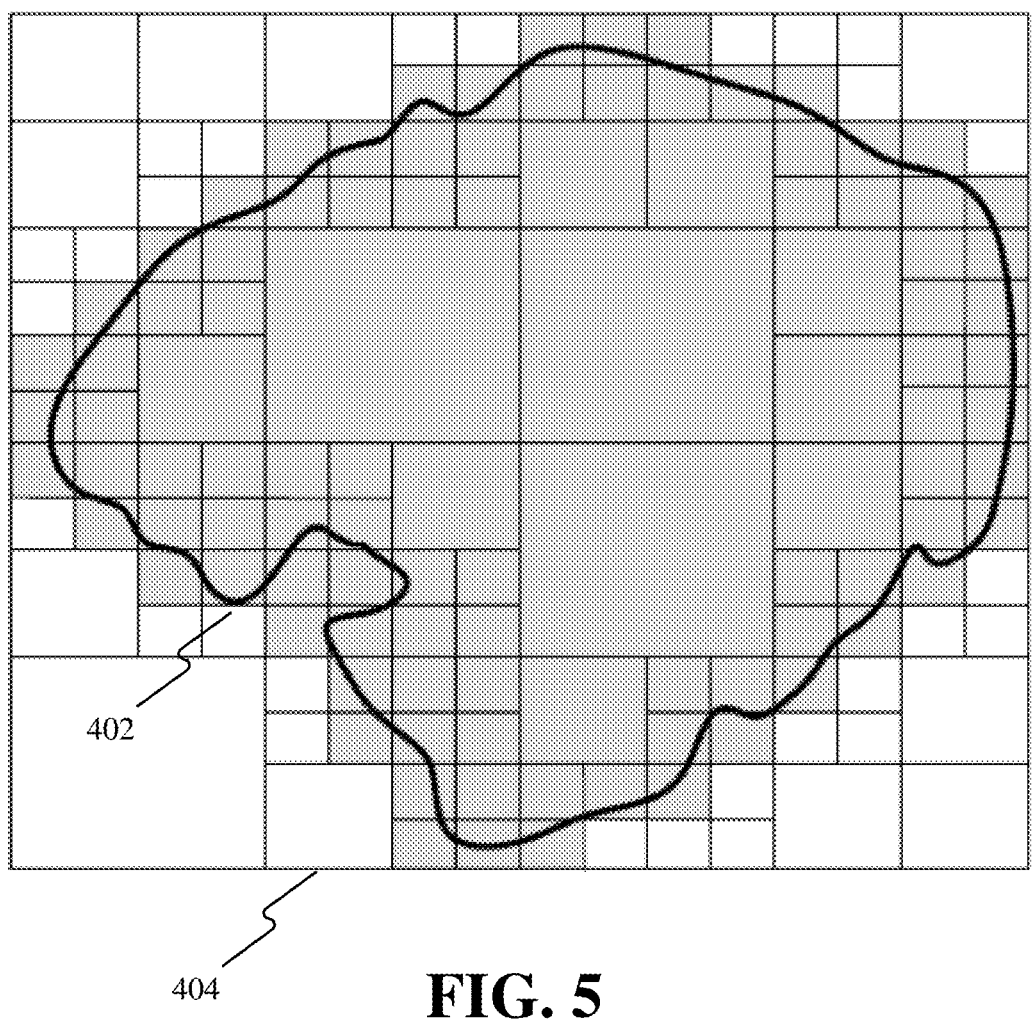
FIG. 5 is a schematic diagram of all grids in a grid set at the end of grid subdivision of the Geof-Demo according to an embodiment.

In the embodiment, a granularity system adopted by the Geof-Demo is as follows: in the case of grid subdivision by one granularity, the original grid is subdivided into four equal grids. Starting from the circumscribed grid of the Geof-Demo, the distribution of grids after the first four subdivisions is shown in FIG. 5; given that the index accuracy of the grid set after the four subdivisions exceeds a predetermined precision threshold, then the subdivision stops. In this case, all the elements in the grid set are grids with the gray background in FIG. 5, where grids containing the boundary of the Geof-Demo have the same granularity which is the finest granularity (i.e., the lower-limit granularity) of all the grids in the grid set, while grids within the boundary of the Geof-Demo have different granularities. Grids with the white background in FIG. 5 are grids outside the geo-fence and will be deleted from the grid set during the subdivision process.

In step 330, a determination whether the index accuracy of the grid set is equal to the predetermined precision threshold is made. If the determination result is yes, the process proceeds to step 360. If the index accuracy is greater than the predetermined precision threshold, step 340 is performed.

In step 340, a knapsack problem is generated in the case where a merged grid containing the boundary of the geo-fence is considered as an item, the increase in the area outside the geo-fence when the item is considered as the index grid in comparison with the area outside the geo-fence before merging is used as the weight of the item, the reduction in the number of grids when the item is used as the index grid in comparison with the number of grids before merging is considered as the price of the item, and the area outside the geo-fence corresponding to the exceedance of the index accuracy of the grid set relative to the predetermined precision threshold is considered as a limited total weight.

With the grids, in the grid set, containing the boundary of the geo-fence and having the lower-limit granularity as starting points, grids are merged into coarser-grained grids level by level, and with each merged grid as an item, the weights and prices of items are determined. The parent-child relationship of the items is determined according to the merged hierarchy, and the tree hierarchy of a knapsack problem is constructed.

Figure 6:
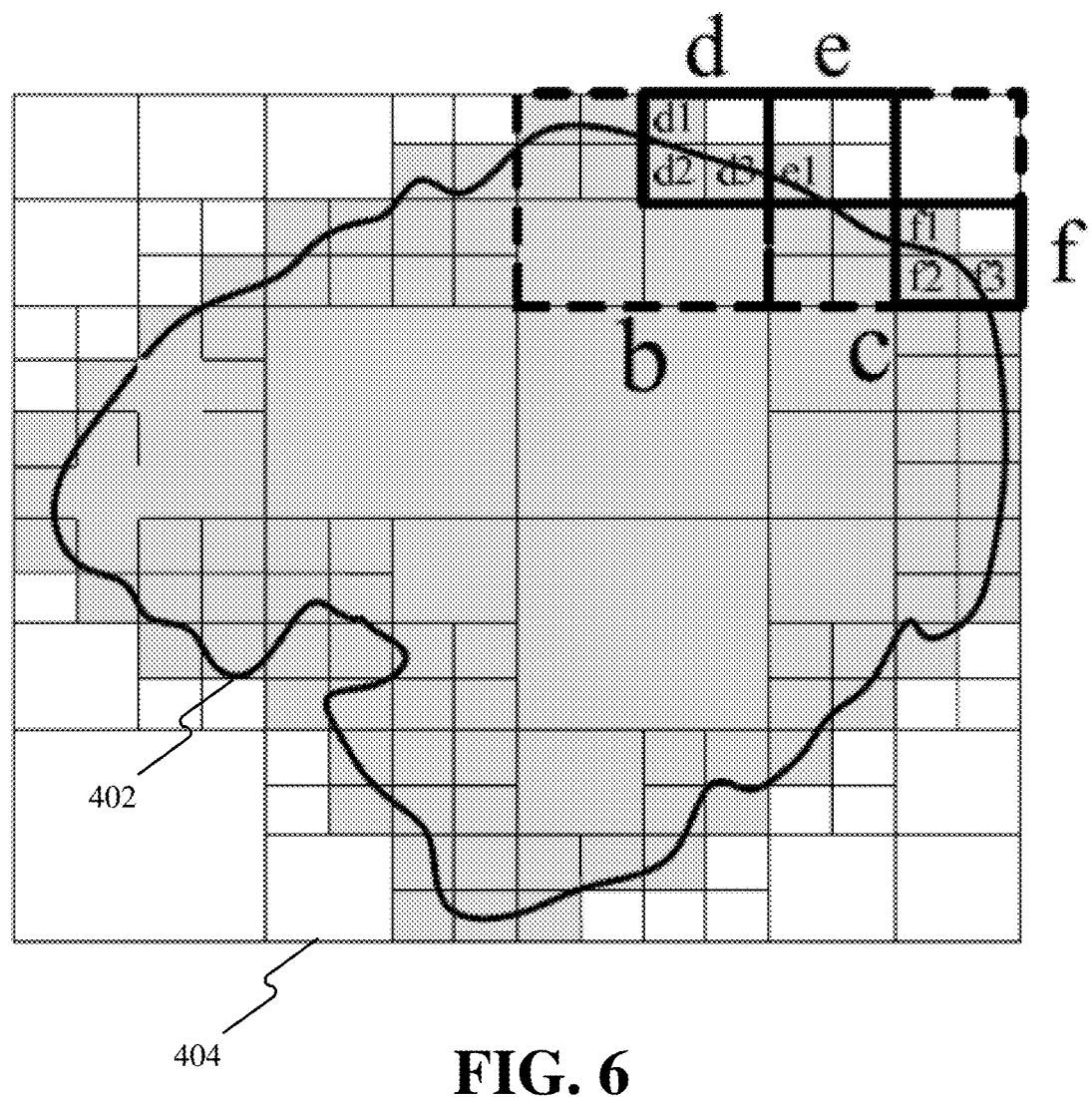
FIG. 6 is a schematic diagram of a grid merging mode of the Geof-Demo according to an embodiment.

Taking the grids d1, d2, d3, e1, f1, f2 and f3 with the lower-limit granularity shown in the upper right corner of FIG. 6 as an example, d1, d2 and d3 may be merged into a coarser-grained grid which is Item d; e1 may be merged into a coarser-grained grid which is Item e; f1, f2, and f3 may be merged into a coarser-grained grid which is Item f. With Item d as an index grid, the increase in the area outside the geo-fence is one lower-limit granularity grid in comparison with the area outside the geo-fence before merging of the grid set, and the reduction in the number of index grids is 2, then it is concluded that, for Item d, weight w=1, price p=2; by that analogy, it is concluded that, for Item e, weight w=3, price p=0, and for Item f, weight w=1, price p=2.

The grid merging further proceeds to a coarser granularity, and d may be merged with other grids in the grid set into a coarser-grained grid which is Item b (indicated by a dashed box in FIG. 6), and Item b is the parent item of Item d; e and f may be merged with other grids in the grid set into a coarser-grained grid which is Item c (indicated by a dashed box in FIG. 6), and Item c is the parent item of Item e and Item f. With Item b as an index grid, the increase in the area outside the geo-fence is one lower-limit granularity grid in comparison with the area outside the geo-fence before merging of the grid set, and the reduction in the number of index grids is 5, then it is concluded that, for Item b, weight w=1, price p=5; by that analogy, it is concluded that, for Item c, weight w=8, price p=4. Item b and Item c may also be merged with other grids in the grid set into a coarser-grained grid which is Item a, it is concluded that, for Item a, weight w=9, price p=12. By that analogy, the merging stops until the circumscribed grid of Geof-Demo is obtained.

According to the parent-child relationship between the items at the time of grid merging, a tree hierarchy from items (such as Item d) merged from grids of the lower-limit granularity to the circumscribed grid may be obtained. Taking the above items a to f as an example, the tree hierarchy shown in FIG. 7 may be obtained according to the parent-child relationship between the items at the time of merging. It should be noted that the tree hierarchy shown in FIG. 7 is only a subtree of the tree hierarchy of Geof-Demo.

In step 350, according to a tree hierarchy of items, under a constraint condition that items containing the same geographical area (i.e., items having direct or indirect parent-child relationship) cannot exist in one knapsack at the same time, all the knapsack states of the knapsack problem are enumerated, each knapsack state is solved, and the optimal one in all solutions is determined as the result of grid merging.

Starting with the states of leaf nodes (i.e., items merged from the grids of the lower-limit granularity) of the tree hierarchy, iteration is performed according to Equation 3 until the states of the circumscribed grid, that is, all the knapsack states of the knapsack problem, are obtained.

Figure 7:
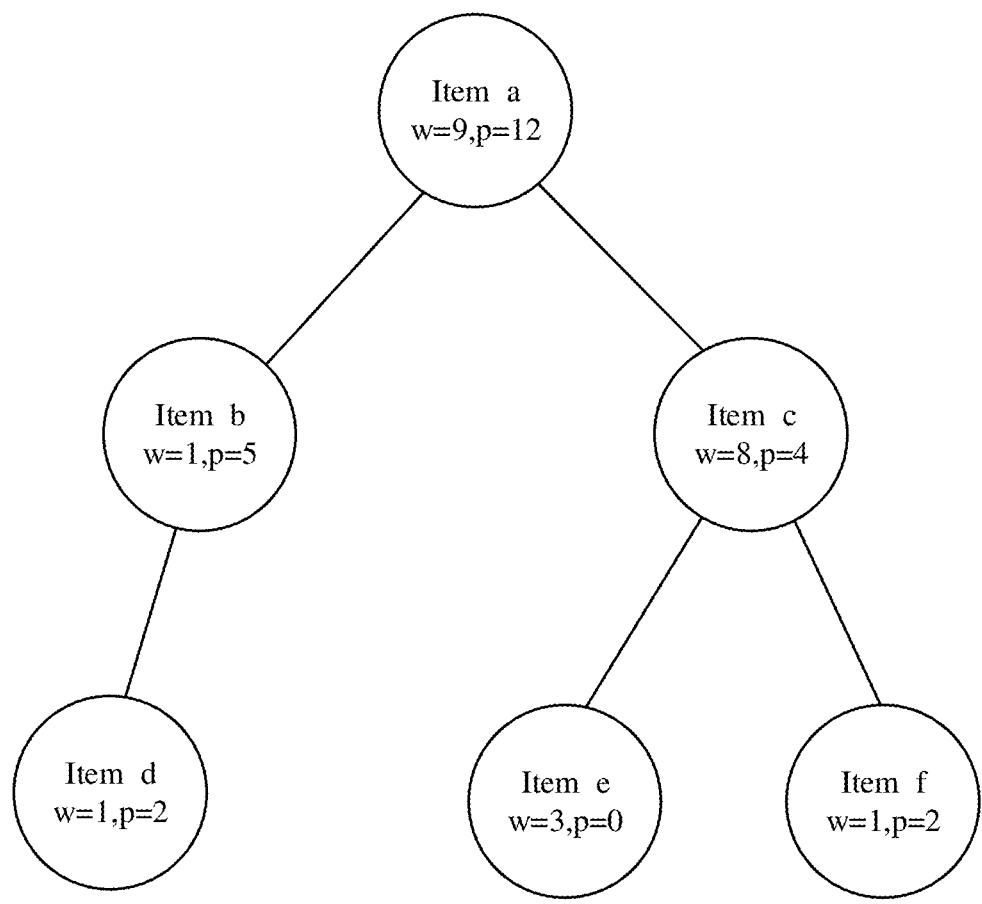
FIG. 7 is a schematic diagram of a subtree of an item tree hierarchy of the Geof-Demo according to an embodiment.

Taking the subtree shown in FIG. 7 as an example, the states of leaf nodes, i.e., Item d, Item e, and Item f, are first determined: state D of Item d={d}, state E of Item d={e}, and state F of Item f={f}. According to Equation 3, the state of Item b is calculated as B=b+D={{b}, {d}}, and the state of Item c is calculated as C=c+E◇F={c,{e,f}}. The state of Item a is then calculated as A=a+B◇C={a,{b,c},{b,e,f},{d,c},{d,e,f}}, and by that analogy, the states of the circumscribed grid may be obtained.

The state of each circumscribed grid is a basic knapsack problem which may be solved according to the prior art. The optimal one of all the solutions to the states is considered as the result of the grid merging. The grid set is then updated according to the result of the grid merging.

Figure 8:
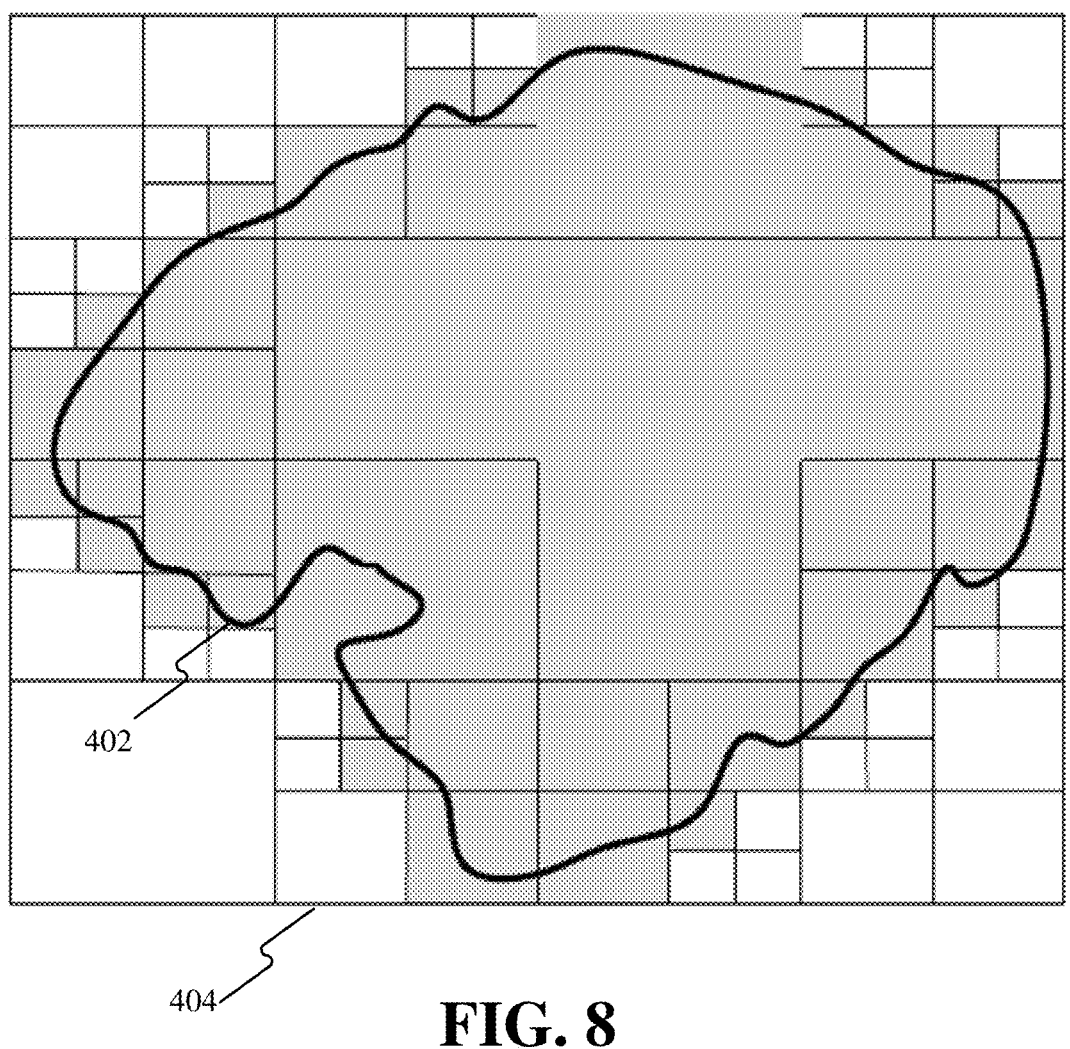
FIG. 8 is a schematic diagram of index grids of the Geof-Demo according to an embodiment.

In step 360, the grids in the grid set are used as the index grids of the geo-fence. The grids in the final grid set of Geof-Demo are shown in FIG. 8.

After applying the above described methods, significant effects have been achieved in comparison to the prior art using single-grained index grids. With a geographical area including fences such as office buildings, residential areas, shopping malls, airports, hospitals, etc. as an object, the comparison results are shown in Table 1:

TABLE 1

| Index | Single-grained index grid | The present application example |
|---|---|---|
| Number of index grids | 5.3 billion | 0.15 billion |
| Index coverage | 100% | 100% |
| Index accuracy | 90.5% | 95% |

It can be seen that in the case of a higher precision, the number of indexes in the above example is reduced by more than 30 times than the single-grained index grids. The higher index accuracy makes the positioning of a geo-fence-based service more accurate, thereby improving service performance and reducing the rate of interruption; a fewer number of indexes make the index data occupy less storage space, thus improving the environment on which the service construction depends and improving the robustness and flexibility of the service.

Corresponding to the foregoing process implementation, embodiments of the present application further provide devices and apparatuses for determining index grids of a geo-fence.

Figure 9:
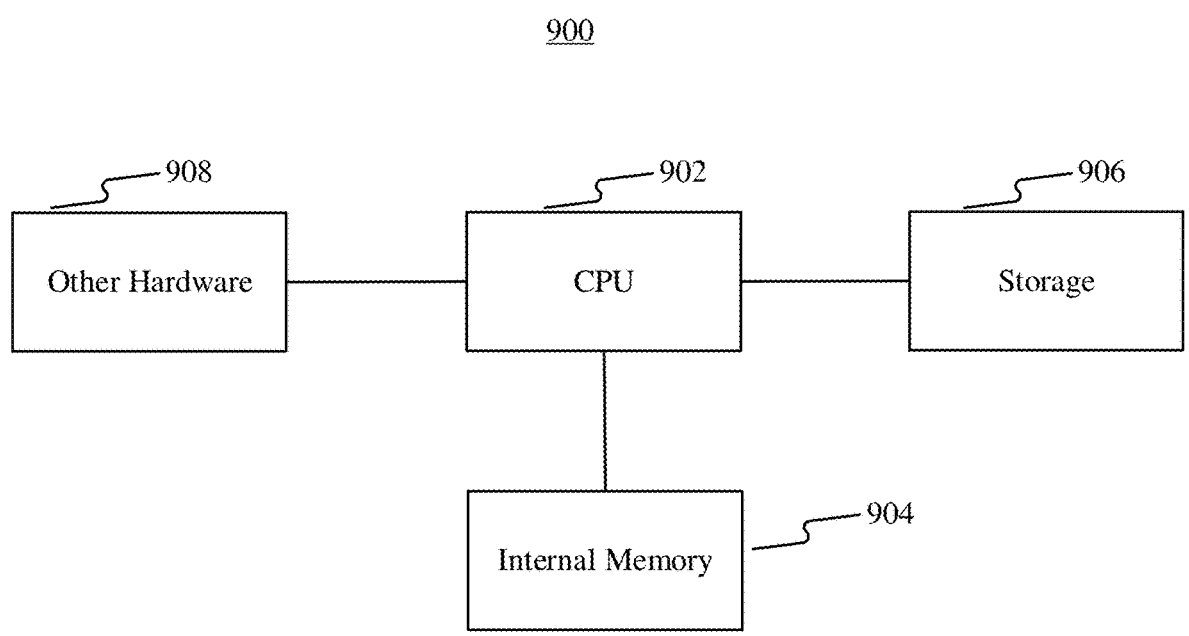
FIG. 9 is a block diagram of a device for determining index grids of a geo-fence according to an embodiment.

FIG. 9 is a block diagram of a device 900 for determining index grids of a geo-fence, according to an embodiment. Referring to FIG. 9, the device 900 may be a computer, and may include a CPU (Central Process Unit) 902, an internal memory 904, a storage 906, and other hardware 908 such as a chip for transmitting and receiving wireless signals, a board card for implementing a network communication function, a display for displaying the geo-fence or index grids of the geo-fence, etc.

The CPU 902 may include one or more dedicated processing units, application-specific integrated circuits (ASICs), field-programmable gate arrays (FPGAs), or various other types of processors or processing units. The CPU 902 is coupled with the internal memory 904 and is configured to execute instructions stored thereon to perform the above described methods for determining index grids of a geo-fence.

The memory 904 may be a non-permanent memory, a random access memory (RAM) and/or a non-volatile memory (such as a read-only memory (ROM) or a flash memory (flash RAM)), etc. Each of the memory 904 and the storage 906 may be any of the computer-readable storage medium described below.

Figure 10:
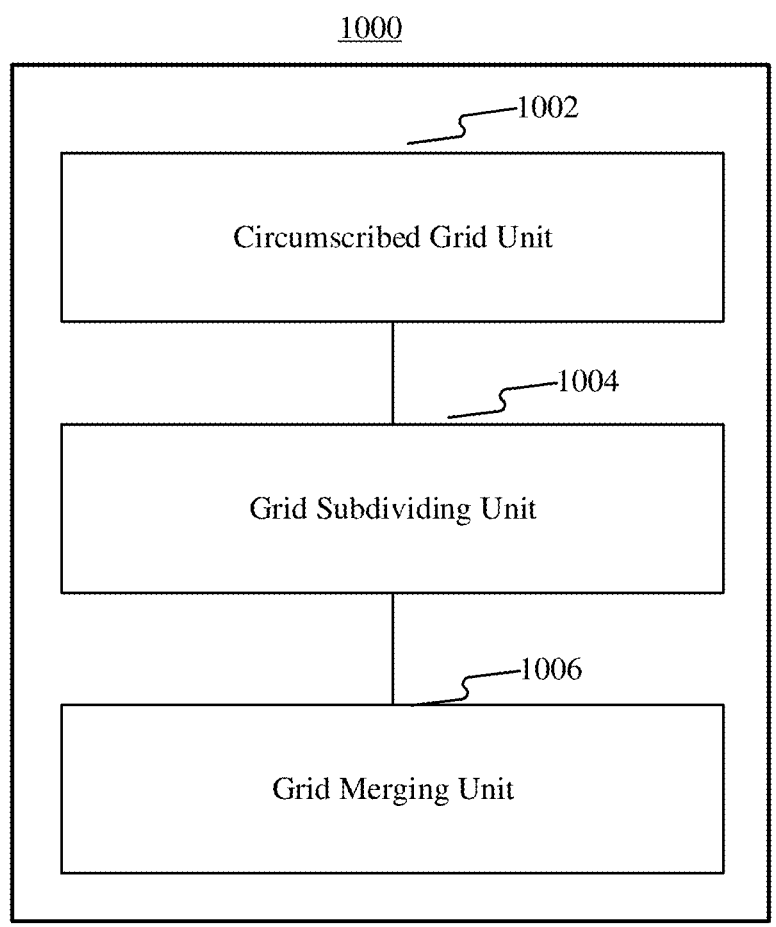
FIG. 10 is a block diagram of an apparatus for determining index grids of a geo-fence according to an embodiment.

FIG. 10 is a block diagram of an apparatus 1000 for determining index grids of a geo-fence, according to an embodiment. The apparatus 1000 include a circumscribed grid unit 1002, a grid subdividing unit 1004, and an index determining unit 1006. The circumscribed grid unit 1002 is configured to determine a circumscribed grid of the geo-fence, the circumscribed grid being a smallest single grid in a pre-defined granularity system that can contain the geo-fence. The grid subdividing unit 1004 is configured to, with the circumscribed grid as a starting point, subdivide grid(s) containing the boundary of the geo-fence into finer-grained grids level by level until the index accuracy of a subdivided grid set is not lower than a predetermined precision threshold, wherein the grid set is composed of grids within the geo-fence and the grids containing the boundary of the geo-fence, and the index accuracy is a ratio of the area of the geo-fence to a sum of areas of all the grids in the grid set. The index determining unit 1006 is configured to take the grids in the grid set as the index grids of the geo-fence.

In an embodiment, the apparatus 1000 further includes a grid merging unit (not shown) configured to merge part of grids in the grid set into coarser-grained grids containing the boundary of the geo-fence when the index accuracy of the grid set is higher than the predetermined precision threshold, so that the index accuracy after merging is not lower than the predetermined precision threshold; and the index determining unit 1006 is configured to take the grids in the grid set after merging, as index grids of the geo-fence.

In the above embodiment, the grid merging unit merges part of grids in the grid set into coarser-grained grids containing the boundary of the geo-fence so that the index accuracy after merging is not lower than the predetermined precision threshold, which includes: generating a knapsack problem in the case where a merged grid containing the boundary of the geo-fence is considered as an item, the increase in the area outside the geo-fence when the item is considered as the index grid in comparison with the area outside the geo-fence before merging is used as the weight of the item, the reduction in the number of grids when the item is used as the index grid in comparison with the number of grids before merging is considered as the price of the item, and the area outside the geo-fence corresponding to the exceedance of the index accuracy of the grid set relative to the predetermined precision threshold is considered as a limited total weight; and taking an optimal solution to the knapsack problem as a result of grid merging. The index determining unit 1006 is configured to update the grid set according to the result of the grid merging and taking grids in the updated grid set as index grids of the geo-fence.

In one embodiment, the grid merging unit determines the optimal solution to the knapsack problem as the result of the grid merging, which includes: constructing a tree hierarchy of items of the knapsack problem, wherein a parent item in the tree hierarchy is merged from its child items; enumerating all knapsack states of the knapsack problem under a constraint condition that items with the parent-child relationship cannot exist in one knapsack at the same time; and solving an answer to each knapsack state, and taking the optimal one in all the answers as the optimal solution to the knapsack problem.

In the above embodiment, the grid merging unit constructs a tree hierarchy of the items of the knapsack problem, which includes: with the lower-limit granularity as a starting point of the current granularity, merging grids of the current granularity in the grid set into coarser-grained grids level by level; with each merged grid as an item, determining the weight and price of each item until all grids are merged into the circumscribed grid; and generating a tree hierarchy of items according to the parent-child relationship between the items, wherein the lower-limit granularity is the granularity of the densest grids in the grid set before merging.

In the above embodiment, under a constraint condition that items with the parent-child relationship cannot exist in one knapsack at the same time, the grid merging unit enumerates all knapsack states of the knapsack problem, which includes: determining the knapsack state of each item functioning as a leaf node of the tree hierarchy; and with child items functioning as leaf nodes as a starting point and an intersection of the Cartesian product of knapsack states of all the child items of the parent item and the parent item itself as the knapsack state of the parent item, performing iteration until the knapsack states of the circumscribed grid corresponding to the root node in the tree hierarchy are obtained, wherein the knapsack states of the circumscribed grid are all the knapsack states of the knapsack problem.

Each of the above described units may be implemented as software, or hardware, or a combination of software and hardware. For example, each of the above described units may be implemented using a processor executing instructions stored in a memory. Also, for example, each of the above described units may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Embodiments of the specification also provide a non-transitory computer-readable storage medium which stores computer-readable program instructions, and when the computer-readable program instructions are executed by a processor of a device, the device performs the above described methods for determining index grids of a geo-fence.

The computer-readable storage medium may include permanent and non-permanent, removable and non-removable media and may store information by any method or technology. The information may be a computer-readable instruction, a data structure, a module of a program or other data. Examples of the computer-readable storage medium include, but are not limited to, a phase change memory (PRAM), a static random access memory (SRAM), a dynamic random access memory (DRAM), other types of random access memory (RAM), a read only memory (ROM), an electrically erasable programmable read-only memory (EEPROM), a flash memory or other memory technologies, a read-only optical disk read-only memory (CD-ROM), a digital versatile disc (DVD) or other optical storages, a magnetic tape cassette, a magnetic disk storage or other magnetic storage devices or any other non-transmission medium for storing information that may be accessed by computing devices.

Those skilled in the art should understand that the embodiments of the specification may be provided as a method, a device, a system, or a computer program product. Accordingly, this application may take the form of a hardware embodiment, a software embodiment, or an embodiment combining software and hardware.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A method for determining index grids of a geo-fence, comprising:
   determining a circumscribed grid of the geo-fence, the circumscribed grid being a smallest single grid in a pre-defined granularity system that can contain the geo-fence;
   with the circumscribed grid as a starting point, subdividing one or more grids containing a boundary of the geo-fence into finer-grained grids level by level until an index accuracy of a subdivided grid set is not lower than a predetermined precision threshold, the grid set being composed of grids within the geo-fence and grids containing the boundary of the geo-fence, the index accuracy being a ratio of an area of the geo-fence to a sum of areas of all the grids in the grid set; and
   taking the grids in the grid set as index grids of the geo-fence,
   wherein the method further comprises:
   if the index accuracy of the grid set is higher than the predetermined precision threshold, merging part of the grids in the grid set into one or more coarser-grained grids containing the boundary of the geo-fence so that the index accuracy after merging is not lower than the predetermined precision threshold, wherein the merging includes: generating a knapsack problem in which a merged grid containing the boundary of the geo-fence is considered as an item, an increase in an area outside the geo-fence when the item is used as an index grid in comparison with the area outside the geo-fence before merging is considered as a weight of the item, a reduction in a number of grids when the item is used as the index grid in comparison with a number of grids before merging is considered as a price of the item, and an area outside the geo-fence corresponding to an exceedance of the index accuracy of the grid set relative to the predetermined precision threshold before merging is considered as a limited total weight, and taking an optimal solution to the knapsack problem as a result of grid merging; and
   updating the grid set according to the result of the grid merging and taking grids in the updated grid set as index grids of the geo-fence.

2. The method according to claim 1, wherein the taking an optimal solution to the knapsack problem as a result of grid merging comprises:
   constructing a tree hierarchy of items of the knapsack problem, a parent item in the tree hierarchy being merged from its child items;
   enumerating all knapsack states of the knapsack problem under a constraint condition that items with a parent-child relationship cannot exist in one knapsack at the same time; and
   solving an answer to each knapsack state, and taking an optimal one in all the answers as the optimal solution to the knapsack problem.

3. The method according to claim 2, wherein the constructing a tree hierarchy of items of the knapsack problem comprises:
   with a lower-limit granularity as a starting point of a current granularity, merging grids of the current granularity in the grid set into one or more coarser-grained grids level by level;
   with each merged grid as an item, determining the weight and the price of the item until all grids are merged into the circumscribed grid; and
   generating the tree hierarchy of items according to the parent-child relationship between the items, wherein the lower-limit granularity is a granularity of densest grids in the grid set before merging.

4. The method according to claim 2, wherein the enumerating all knapsack states of the knapsack problem under a constraint condition that items with the parent-child relationship cannot exist in one knapsack at the same time comprises:
   determining the knapsack state of each item functioning as a leaf node of the tree hierarchy; and
   with child items functioning as leaf nodes as a starting point and an intersection of a Cartesian product of knapsack states of all the child items of the parent item and the parent item itself as the knapsack state of the parent item, performing iteration until the knapsack states of the circumscribed grid corresponding to a root node in the tree hierarchy are obtained, wherein the knapsack states of the circumscribed grid are all the knapsack states of the knapsack problem.

5. A device for determining index grids of a geo-fence, comprising:
   a processor; and
   a memory for storing instructions executable by the processor;
   wherein the processor is configured to:
   determine a circumscribed grid of the geo-fence, the circumscribed grid being a smallest single grid in a pre-defined granularity system that can contain the geo-fence;
   with the circumscribed grid as a starting point, subdivide one or more grids containing a boundary of the geo-fence into finer-grained grids level by level until an index accuracy of a subdivided grid set is not lower than a predetermined precision threshold, the grid set being composed of grids within the geo-fence and grids containing the boundary of the geo-fence, the index accuracy being a ratio of an area of the geo-fence to a sum of areas of all the grids in the grid set; and
   take the grids in the grid set as index grids of the geo-fence, wherein the processor is further configured to:
if the index accuracy of the grid set is higher than the predetermined precision threshold, merge part of the grids in the grid set into one or more coarser-grained grids containing the boundary of the geo-fence so that the index accuracy after merging is not lower than the predetermined precision threshold, wherein merging part of the grids includes: generating a knapsack problem in which a merged grid containing the boundary of the geo-fence is considered as an item, an increase in an area outside the geo-fence when the item is used as an index grid in comparison with the area outside the geo-fence before merging is considered as a weight of the item, a reduction in a number of grids when the item is used as the index grid in comparison with a number of grids before merging is considered as a price of the item, and an area outside the geo-fence corresponding to an exceedance of the index accuracy of the grid set relative to the predetermined precision threshold before merging is considered as a limited total weight, and taking an optimal solution to the knapsack problem as a result of grid merging; and
update the grid set according to the result of the grid merging and take grids in the updated grid set as index grids of the geo-fence.

6. The device according to claim 5, wherein the processor is further configured to:
construct a tree hierarchy of items of the knapsack problem, a parent item in the tree hierarchy being merged from its child items;
enumerate all knapsack states of the knapsack problem under a constraint condition that items with a parent-child relationship cannot exist in one knapsack at the same time; and
solve an answer to each knapsack state, and take an optimal one in all the answers as the optimal solution to the knapsack problem.

7. The device according to claim 6, wherein the processor is further configured to:
with a lower-limit granularity as a starting point of a current granularity, merge grids of the current granularity in the grid set into one or more coarser-grained grids level by level;
with each merged grid as an item, determine the weight and the price of the item until all grids are merged into the circumscribed grid; and
generate the tree hierarchy of items according to the parent-child relationship between the items, wherein the lower-limit granularity is a granularity of the densest grids in the grid set before merging.

8. The device according to claim 6, wherein the processor is further configured to:
determine the knapsack state of each item functioning as a leaf node of the tree hierarchy; and
with child items functioning as leaf nodes as a starting point and an intersection of a Cartesian product of knapsack states of all the child items of the parent item and the parent item itself as the knapsack state of the parent item, perform iteration until the knapsack states of the circumscribed grid corresponding to a root node in the tree hierarchy are obtained, wherein the knapsack states of the circumscribed grid are all the knapsack states of the knapsack problem.

9. A computer-readable storage medium, having stored thereon a computer program, wherein when the computer program is executed by a processor of a device, the computer program causes the device to perform a method for determining index grids of a geo-fence, the method comprising:
determining a circumscribed grid of the geo-fence, the circumscribed grid being a smallest single grid in a pre-defined granularity system that can contain the geo-fence;
with the circumscribed grid as a starting point, subdividing one or more grids containing a boundary of the geo-fence into finer-grained grids level by level until an index accuracy of a subdivided grid set is not lower than a predetermined precision threshold, the grid set being composed of grids within the geo-fence and grids containing the boundary of the geo-fence, the index accuracy being a ratio of an area of the geo-fence to a sum of areas of all the grids in the grid set; and
taking the grids in the grid set as index grids of the geo-fence,
wherein the method further comprises:
if the index accuracy of the grid set is higher than the predetermined precision threshold, merging part of the grids in the grid set into one or more coarser-grained grids containing the boundary of the geo-fence so that the index accuracy after merging is not lower than the predetermined precision threshold, wherein the merging includes: generating a knapsack problem in which a merged grid containing the boundary of the geo-fence is considered as an item, an increase in an area outside the geo-fence when the item is used as an index grid in comparison with the area outside the geo-fence before merging is considered as a weight of the item, a reduction in a number of grids when the item is used as the index grid in comparison with a number of grids before merging is considered as a price of the item, and an area outside the geo-fence corresponding to an exceedance of the index accuracy of the grid set relative to the predetermined precision threshold before merging is considered as a limited total weight, and taking an optimal solution to the knapsack problem as a result of grid merging; and
updating the grid set according to the result of the grid merging and taking grids in the updated grid set as index grids of the geo-fence.

10. The computer-readable storage medium according to claim 9, wherein the taking an optimal solution to the knapsack problem as a result of grid merging comprises:
constructing a tree hierarchy of items of the knapsack problem, a parent item in the tree hierarchy being merged from its child items;
enumerating all knapsack states of the knapsack problem under a constraint condition that items with a parent-child relationship cannot exist in one knapsack at the same time; and
solving an answer to each knapsack state, and taking an optimal one in all the answers as the optimal solution to the knapsack problem.

11. The computer-readable storage medium according to claim 10, wherein the constructing a tree hierarchy of items of the knapsack problem comprises:
with a lower-limit granularity as a starting point of a current granularity, merging grids of the current granularity in the grid set into one or more coarser-grained grids level by level;
with each merged grid as an item, determining the weight and the price of the item until all grids are merged into the circumscribed grid; and generating the tree hierarchy of items according to the parent-child relationship between the items, wherein the lower-limit granularity is a granularity of densest grids in the grid set before merging.

12. The computer-readable storage medium according to claim 10, wherein the enumerating all knapsack states of the knapsack problem under a constraint condition that items with the parent-child relationship cannot exist in one knapsack at the same time comprises:

determining the knapsack state of each item functioning as a leaf node of the tree hierarchy; and with child items functioning as leaf nodes as a starting point and an intersection of a Cartesian product of knapsack states of all the child items of the parent item and the parent item itself as the knapsack state of the parent item, performing iteration until the knapsack states of the circumscribed grid corresponding to a root node in the tree hierarchy are obtained, wherein the knapsack states of the circumscribed grid are all the knapsack states of the knapsack problem.

\* \* \* \* \*